(12) United States Patent
Windrem

(10) Patent No.: US 6,281,941 B1
(45) Date of Patent: Aug. 28, 2001

(54) MIX-EFFECT BANK WITH MULTIPLE PROGRAMMABLE OUTPUTS

(75) Inventor: Kevin D. Windrem, Grass Valley, CA (US)

(73) Assignee: Grass Valley (US), Inc., Nevada City, CA (US)

( * ) Notice: Subject to any disclaimer, the term of this patent is extended or adjusted under 35 U.S.C. 154(b) by 0 days.

(21) Appl. No.: 09/365,332

(22) Filed: Jul. 30, 1999

(51) Int. Cl.[7] .............................. H04N 9/74; H04N 5/268
(52) U.S. Cl. ...................... 348/585; 348/705; 348/591; 348/594
(58) Field of Search ...................... 348/578, 585, 348/586, 587, 590, 591, 593, 594, 705; H04N 9/74, 5/268

(56) References Cited

U.S. PATENT DOCUMENTS 4,947,254 * 8/1990 Abt ........................................ 348/585
5,166,797 * 11/1992 Angell ................................... 348/705

* cited by examiner

Primary Examiner—Sherrie Hsia
(74) Attorney, Agent, or Firm—Smith-Hill and Bedell

(57) ABSTRACT

A mix-effect bank architecture for a production video switcher has multiple programmable outputs, the outputs being determined by a selected operational mode including split, programmable clean feed and mix minus modes. Four keyers with video and key signal inputs produce four outputs. The outputs are selectively routed to four corresponding inputs of four mixers, which mixers also have two pairs of background/utility video inputs. The four mixers provide four outputs which are determined by the selected operating mode. A pair of background video signals may be provided to all of the mixers to provide programmable clean feed outputs, or the pair of background video signals and a mix minus pair of background video signals may be provided to the mixers to provide mix minus outputs, or a primary set of background video signals may be provided to two mixers and a secondary set of background video signals may be provided to the other two mixers for the split mode.

6 Claims, 6 Drawing Sheets

| MODE | BKGD BUS | | | | M/E OUTPUTS | | | |
|---|---|---|---|---|---|---|---|---|
| | A | B | U1 | U2 | A | B | C | D |
| PROG CF | A FOR ALL OUTPUTS | B FOR ALL OUTPUTS | | | PGM A | PGM B | PGM C | PGM D |
| MIX MINUS | A | B | A´ | B´ | PGM | PROG CF | PGM´ | PROG CF´ |
| SPLIT M/E | PRIMARY A | PRIMARY B | EITHER OR BOTH MAY BE USED FOR SECONDARY BACKGROUND BUSES | | PRIMARY PGM | PRIMARY PROG CF | SECONDARY PGM | SECONDARY PROG CF |

Fig. 6

MIX-EFFECT BANK WITH MULTIPLE PROGRAMMABLE OUTPUTS

BACKGROUND OF THE INVENTION

The present invention relates to video signal processing, and more particularly to a production video switcher having a mix-effect (M/E) bank with multiple programmable outputs.

The current state of the art production switchers divide functionality into mix-effects (M/E) banks. These M/E banks have fixed functionality—typically two keyers, one or two wipe generators and a transition component. In many cases resources within an M/E bank are unuseable because of the way an operator chooses to organize the work. At the same time the operator may not be able to locate resources needed to add more components to a video image.

Live video production requires the generation of multiple feeds, each customized for its use. For example the ABC "bug" should not appear on the feed sent to CNN. In many cases additional production video switchers are required to customize feeds.

What is desired is a production switcher that has mix-effect banks which are flexible and enable full use of all the resources available.

BRIEF SUMMARY OF THE INVENTION

Accordingly the present invention provides a production video switcher having a mix-effect (M/E) bank with multiple programmable outputs. A multiple of keyers are selectively coupled to a corresponding multiple of mixers via a router. The mixers through the router also are coupled to a pair of background video signal buses—one primary and the other utility. By appropriately connecting the background signal buses with the mixers different M/E operational modes may be achieved, such as programmable clean feed, mix minus and split modes.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 6 is a table view illustrating how the M/E bank of FIG. 5 is used for each M/E mode of FIGS. 1–4 according to the present invention.

DETAILED DESCRIPTION OF THE INVENTION

Figure 1:
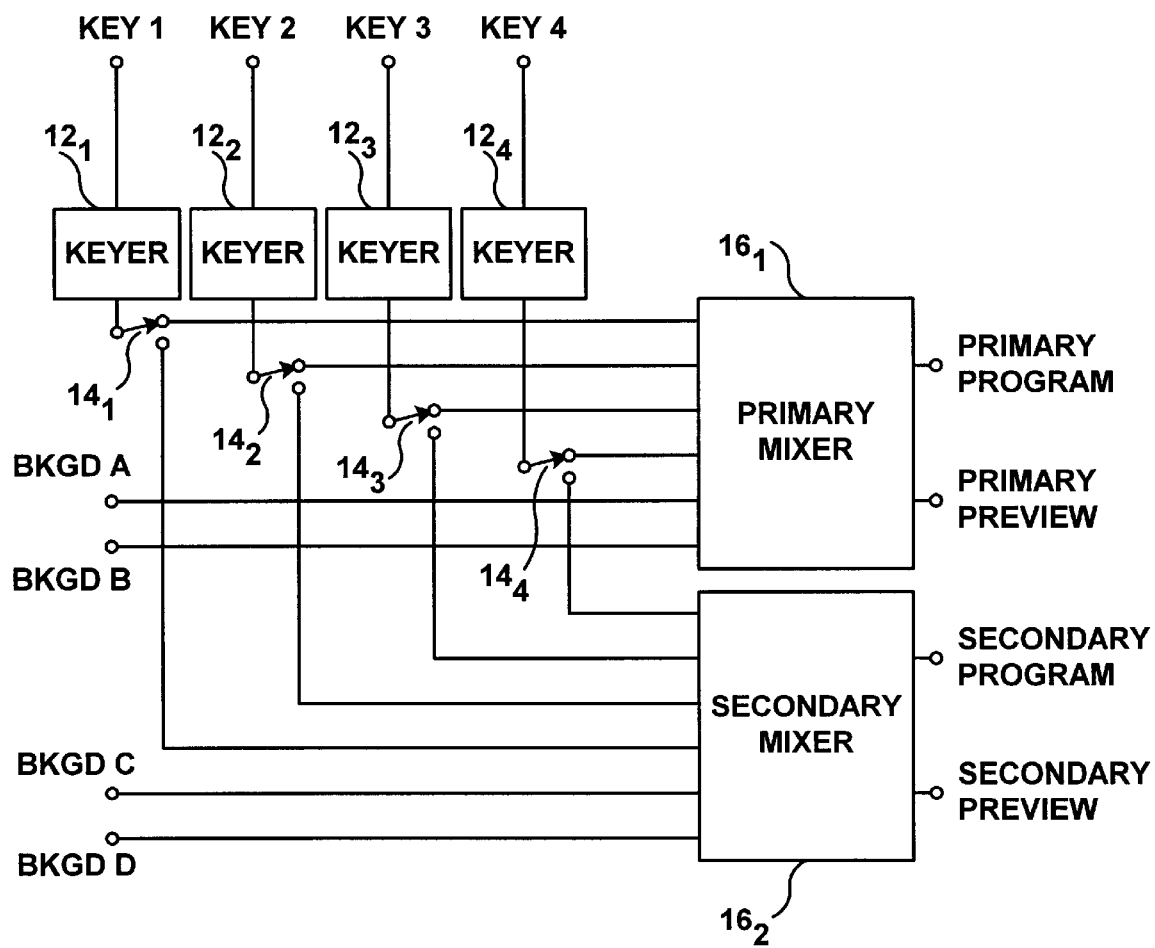
FIG. 1 is a block diagram view of a simplified M/E bank demonstrating M/E partitioning according to the present invention.

Referring now to FIG. 1 a split M/E mode is shown. The M/E resources are split into independent partitions. Key signals are input to respective keyers 12. The outputs from the keyers 12 are input to respective switches 14. The switches 14 have outputs coupled to respective primary and secondary mixers 16. Each mixer 16 has as inputs, in addition to the outputs from the switches 14, a couple of independent background video signals. Each mixer 16 provides as outputs a program and a preview feed. Splitting the M/E resources into partitions adds the ability to increase the number of M/Es and for each M/E to have different capability. Splitting an M/E reduces the capability of each partition, but this may not hamper operation.

Partitioning an M/E involves assigning resources—keyers, wipe generators, input buses, borderline generators, etc.—with either the primary or secondary outputs. To maintain independence a resource may not be assigned to both primary and secondary partitions. Each M/E partition has its own set of outputs and has an independent effects memory system (not shown). Each partition appears as an independent reentry source (not shown) to the rest of the production video switcher.

Figure 2:
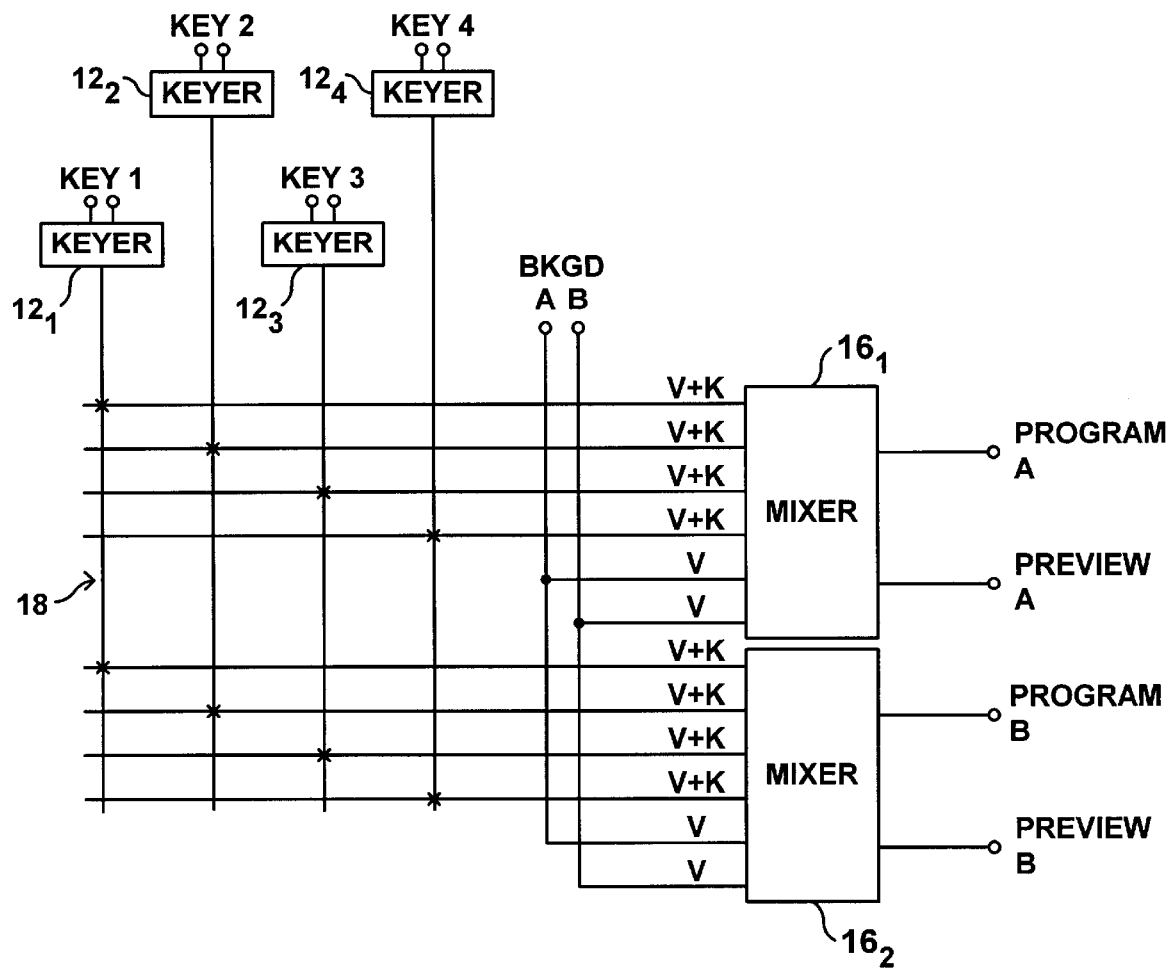
FIG. 2 is a block diagram view of a simplified M/E bank demonstrating programmable clean feed according to the present invention.

For a programmable clean feed M/E mode the operator decides which keys appear on each output, allowing one M/E to produce several feeds customized for their use. This is illustrated in FIG. 2. A router 18 between the keyers 12 and mixers 16 controls which keyers are visible on each of the outputs. All mixers 16 receive the same background video signals. For simplicity only two outputs are shown.

Figure 3:
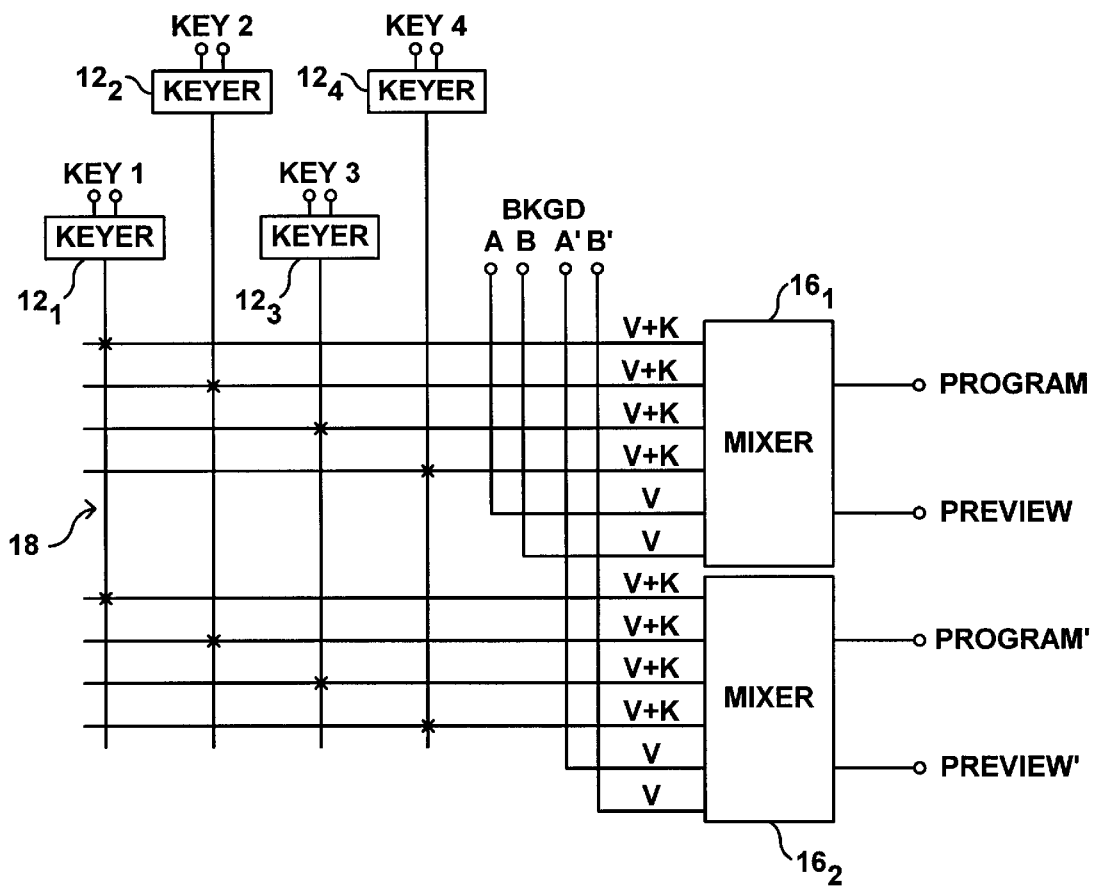
FIG. 3 is a block diagram view of an MIE bank is mix minus mode according to the present invention.

A mix minus mode, which is similar to the programmable clean feed mode except that substitutions to the background video signals are possible, provides a completely separate reentry path for the customized feed. The term "mix minus" is commonly used to describe a separate audio mix which is a modified copy of he main output of the mixer. The term implies that the alternate mix is everything except certain sources, but in practice a mix minus output may also include sources which do not appear on the primary output. For example a record feed may include audience microphones which are not used for the primary sound reinforcement mix. A similar approach is used for video mixing in an M/E as shown in FIG. 3. The mix minus path is designated by A', B', Program' and Preview'.

Figure 4:
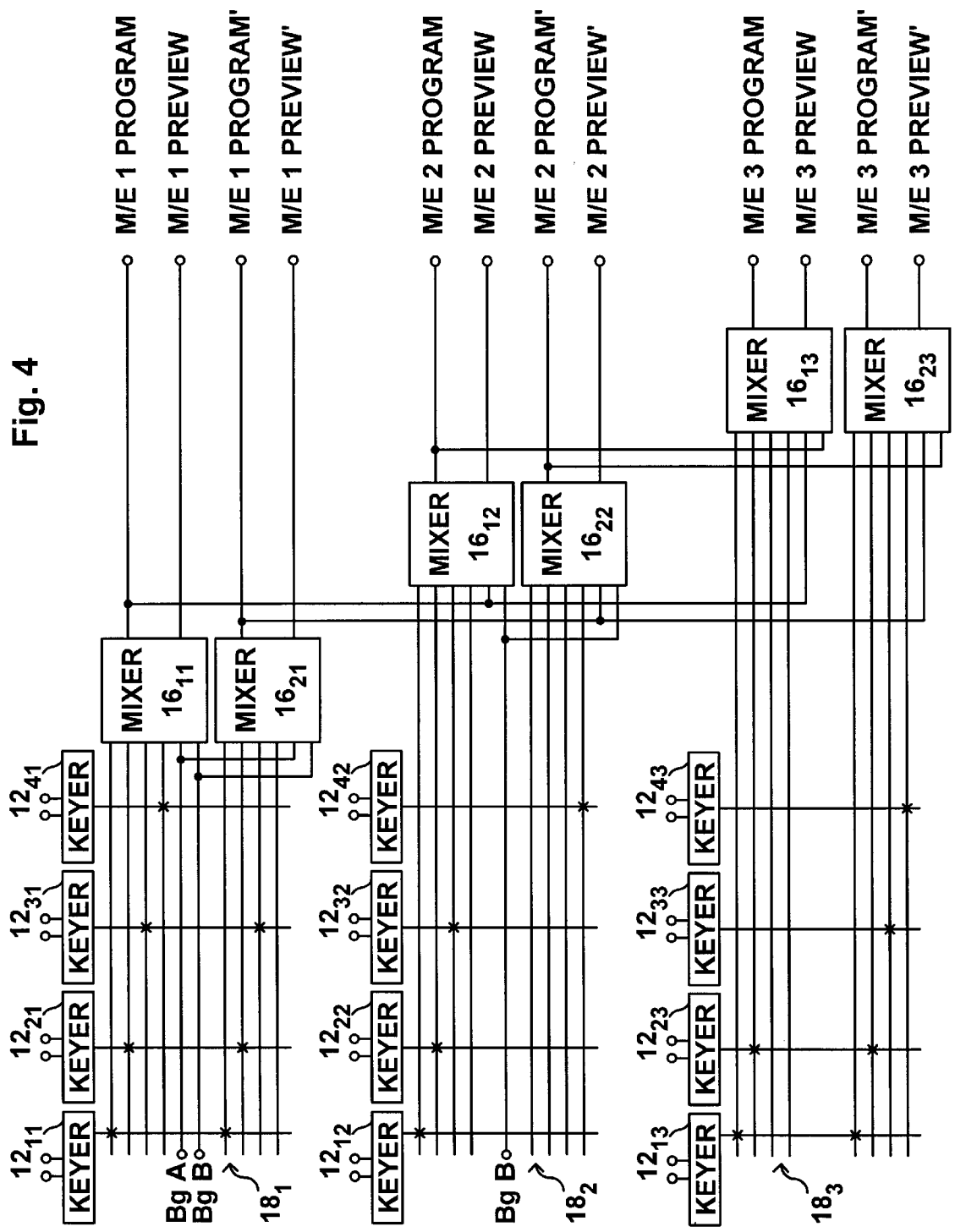
FIG. 4 is a block diagram view of an M/E bank providing mix minus reentry according to the present invention.

Referring now to FIG. 4 an example of a reentry and key mix minus/plus scenario is shown. M/E 1 is programmed to omit Key 4 from the mix minus output, while both A and B background video signals come from primary sources. M/E 2 is programmed to omit Keys 1 and 2 and substitute Key 4 for Key 3, with the M/E 1 outputs reentered into its A background video signal bus and the B background video signal coming from a primary source. M/E 3 is programmed to exclude Keys 3 and 4 from the primary output—a "mix plus" operation—while its A background video signal comes from M/E 1 and its B background video signal comes from M/E 2. M/E 1 Key 4 appears on the M/E 3 Program output, but not on the M/E 3 Program' output, etc.

Figure 5:
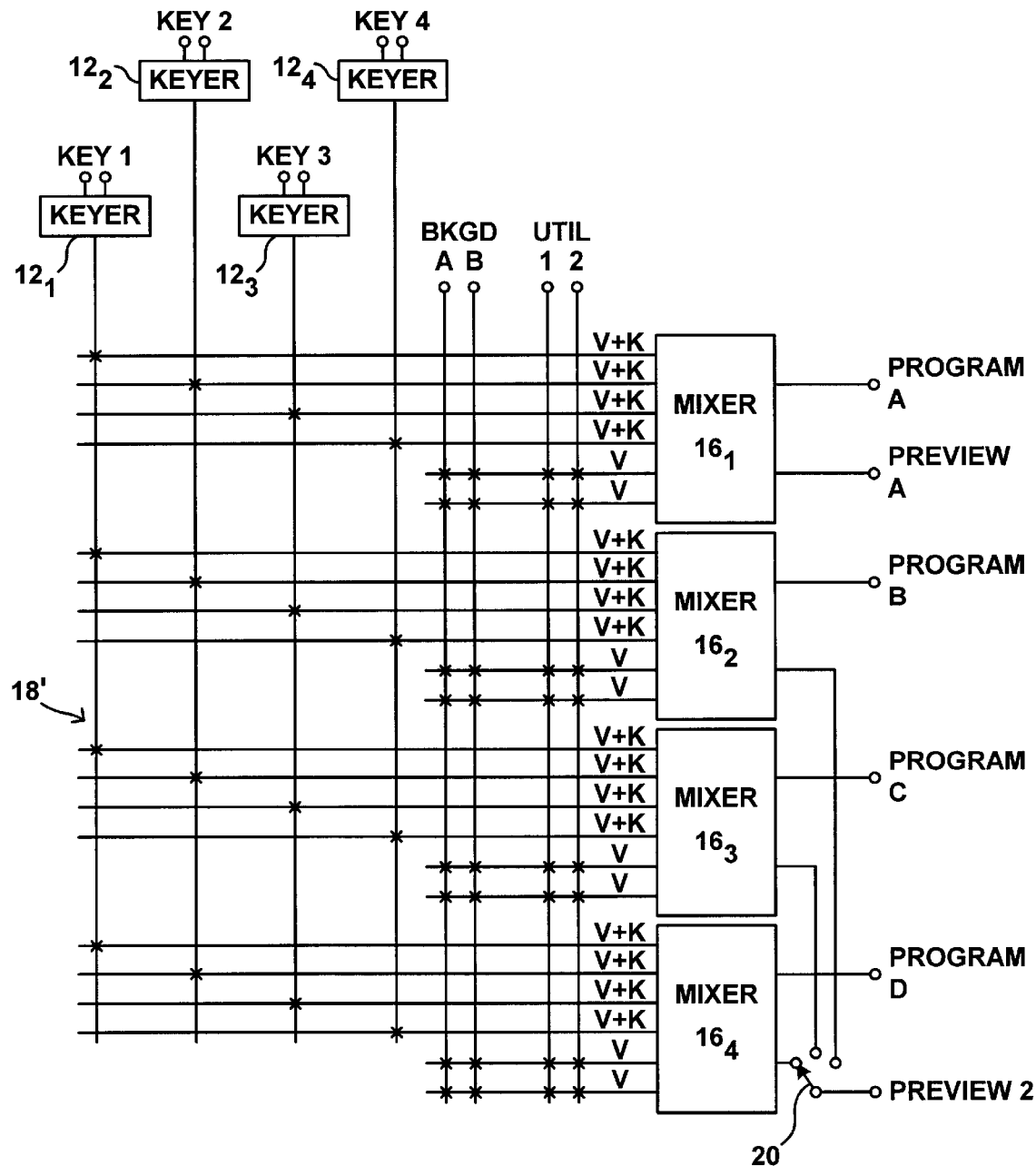
FIG. 5 is a complete diagram view of an M/E bank with multiple programmable outputs incorporating the features of FIGS. 1–4 according to the present invention.

Combining the concepts of FIGS. 1–4 yields a flexible M/E architecture as shown in FIG. 5. For this implementation four identical mixers 16 are used, each having access to any of the four keyers 12 and to any of four background video signals via the router 18'. This architecture provides all the modes described above. Only two preview outputs, one switchable via switch 20, are shown in this embodiment to save cost and reduce the number of reentries in a main crosspoint matrix (not shown).

The operation of the M/E of FIG. 5 is described in conjunction with the Table of FIG. 6. The Table illustrates the video signals available on each background video signal bus and the corresponding M/E outputs for each of the programmable clean feed, mix minus and split M/E modes. For the programmable clean feed mode the A and B background video buses are coupled to separate primary sources and used for all outputs, and the U1 and U2 buses are not used. Each M/E provides its own Program output depending upon which shaped video signals from the keyers 12 are routed to the corresponding mixer 16 by the router 18'. In this way one feed may have the ABC "bug" while another does not, for example.

For the mix minus mode the A and B background video signals are provided on the A and B buses as well as the A' and B' background video signals on the U1 and U2 buses respectively. The M/E A output provides the Program output, M/E B output provides the programmable clean feed output, M/E C output provides the mix minus program output, and M/E D output provides the mix minus programmable clean feed output.

For the split M/E mode the A and B buses provide primary background video signals and the U1 and U2 buses may be used for secondary background signals. The M/E A output provides the primary program output and the M/E B output provides the primary programmable clean feed output, while the M/E C output provides the secondary program output and the M/E D output provides the secondary programmable clean feed output.

Thus the present invention provides a mix-effect bank architecture with multiple programmable outputs using multiple keyers and multiple mixers coupled by a router, and at least two sets of background buses, so that programmable clean feed, mix minus and split M/E modes may be programmably accommodated.

What is claimed is:

1. A mix-effects bank architecture with multiple programmable outputs comprising:

a plurality of keyers, each having video and key signals as inputs and providing an output;

a plurality of mixers, each having a number of inputs equal to the number of keyers, having a background video signal input, and having program and preview outputs; and a router for programmably coupling the outputs from the keyers to selected inputs of the mixers and a background video signal bus to the background video signal input to achieve a specified mode of operation.

2. The mix-effects bank as recited in claim 1 wherein the specified mode of operation is selected from the group consisting of programmable clean feed, mix minus and split modes.

3. The mix-effects bank as recited in claim 1 wherein the router couples a background video signal from a primary source on the background video signal bus to the background video signal input for all of the mixers so that the mode of operation is a programmable clean feed for each of the mixer outputs.

4. The mix-effects bank as recited in claim 1 wherein the router couples a background video signal from a primary source on the background video signal bus to the background video signal input of one mixer and couples a mix minus background video signal on the background video signal bus to the background video signal input of another mixer so that the mode of operation is a mix minus mode for the mixer outputs.

5. The mix-effects bank as recited in claim 4 wherein the router couples a program feed from a prior mix-effects bank on the background video signal bus to the background video signal input of one mixer and couples a mix minus program feed from the prior mix-effects bank on the background video signal bus to the background video signal input of another mixer so that the mode of operation is a mix minus mode with reentry.

6. The mix-effects bank as recited in claim 1 wherein the router couples a primary background video signal from a primary source on the background video signal bus to the background video signal input of one mixer and a secondary background video signal from another primary source on the background video signal bus to the background video signal input of another mixer so that the mode of operation is a split mode providing primary program and programmable clean feed outputs and providing secondary program and programmable clean feed outputs.

* * * * *